United States Patent
Shen et al.

(10) Patent No.: US 9,113,460 B2
(45) Date of Patent: *Aug. 18, 2015

(54) MAPPING BETWEEN LOGICAL AND PHYSICAL UPLINK CONTROL RESOURCE BLOCKS IN WIRELESS NETWORKS

(71) Applicant: TEXAS INSTRUMENTS INCORPORATED, Dallas, TX (US)

(72) Inventors: Zukang Shen, Richardson, TX (US); Tarik Muharemovic, Pearland, TX (US); Jing Jiang, Wellesley, MA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/155,091

(22) Filed: Jan. 14, 2014

(65) Prior Publication Data

US 2014/0126525 A1 May 8, 2014

Related U.S. Application Data

(63) Continuation of application No. 12/372,980, filed on Feb. 18, 2009, now Pat. No. 8,630,240.

(60) Provisional application No. 61/029,674, filed on Feb. 19, 2008.

(51) Int. Cl.
  *H04W 4/00* (2009.01)
  *H04W 72/04* (2009.01)
  *H04L 5/00* (2006.01)

(52) U.S. Cl.
  CPC ......... *H04W 72/0413* (2013.01); *H04L 5/0053* (2013.01); *H04L 5/0055* (2013.01); *H04W 72/04* (2013.01); *H04W 72/0406* (2013.01)

(58) Field of Classification Search
  None
  See application file for complete search history.

(56) References Cited

U.S. PATENT DOCUMENTS 8,169,964 B2   5/2012   Kolding et al.
8,200,252 B2   6/2012   Lee et al.
(Continued)

FOREIGN PATENT DOCUMENTS

GB   2457242 A   12/2009

OTHER PUBLICATIONS

3GPP, "3rd Generation Partnership Project; Technical Specification Group Radio Access Network; Evolved Universal Terrestrial Radio Access (E-UTRA); Physcial Channels and Modulation", 3GPP TS 36.211, V8.4.0, (Release 8), Valbonne, France, Sep. 2008, pp. 1-80.

(Continued)

*Primary Examiner* — Khoa Huynh
(74) *Attorney, Agent, or Firm* — Ronald O. Neerings; Frank D. Cimino

(57) ABSTRACT

A transmission of information from a secondary to a primary node occurs in a plurality of N logical time durations on an uplink channel in a wireless network. A scheme for mapping between logical uplink control channel (PUCCH) resource blocks (RBs) and physical RBs (PRBs) used by PUCCH is described. A logical uplink control resource block index $n_{LRB}$ is derived by the secondary node in response to information from the primary node. The secondary node then maps the logical uplink control resource block index $n_{LRB}$ to a first uplink physical resource block index $n_{PRB,1}$ of a plurality of uplink physical resource blocks, wherein $n_{PRB,1}=n_{LRB}/2$ if $n_{LRB}$ is even and $n_{PRB,1}=N_{PRB}-\text{ceil}(n_{LRB}/2)$ if $n_{LRB}$ is odd; wherein $N_{PRB}$ is the total number of the plurality of uplink physical resource blocks; and wherein ceil denotes the ceiling operation. The secondary node then transmits an uplink control information in a subframe using one of the plurality of uplink physical resource blocks indexed by $n_{PRB,1}$.

19 Claims, 6 Drawing Sheets

(56) References Cited

U.S. PATENT DOCUMENTS

| | | | |
|---|---|---|---|
| 8,521,881 | B2 | 8/2013 | Awad et al. |
| 8,526,371 | B2 | 9/2013 | Malladi et al. |
| 2008/0175195 | A1 | 7/2008 | Cho et al. |
| 2008/0305745 | A1* | 12/2008 | Zhang et al. ............... 455/67.11 |
| 2009/0207797 | A1 | 8/2009 | Shen et al. |
| 2009/0310475 | A1* | 12/2009 | Seo et al. ...................... 370/203 |
| 2010/0290363 | A1* | 11/2010 | Johansson et al. ............ 370/252 |

OTHER PUBLICATIONS

Samsung, "CCE to RE mapping", 3GPP TSG RAN1 WG1 #49, Kobe, Japan, May 7-11, 2007.

Samsung, "Implicit resource allocation for uplink ACK/NACK signaling", 3GPP TSG RAN1 WG1 #49, Kobe, Japan, May 7-11, 2007.

Samsung, "Uplink control channel design", 3GPP TSG RAN1 WG1 #49, Kobe, Japan, May 7-11, 2007.

Etri, "Sequence allocation and hopping for uplink ACK/NACK channels" 3GPP TSG RAN WG1 Meeting #50, Athens, Greece, Aug. 20-24, 2007.

Nokia Siemens Networks, Nokia, "Signaling of Implicit ACK/NACK resources", 3GPP TSG RAN WG1 Meeting #50, Athens, Greece, Aug. 20-24, 2007.

Motorola, "UL ACK/NACK Implicit Mapping", 3GPP TSG RAN1 #50-bis, Shanghai, China, Oct. 8-12, 2007.

Samsung, "UL RB mapping and slot-level re-mapping for ACK/NACK and CQI", 3GPP TSG RAN WG1 #50-bis, Shanghai, China, Oct. 8-12, 2007.

Mitsubishi Electric, "Distributed VRB mapping over 3 PRGs", 3GPP TSG RAN WG1 Meeting #50-bis, Shanghai, China, Oct. 8-12, 2007.

Samsung, Nokia, Nokia Siemens Networks, Panasonic, TI, "Joint proposal on uplink ACK/NACK channelization", 3GPP TSG RAN WG1 #51-bis, Sevilla, Spain, Jan. 14-18, 2008.

3rd Generation Partnership Project, Technical Specification Group Radio Access Network, Evolved Universal Terrestrial Radio Access (E-UTRA), Physical channels and modulation (Release 8); 3GPP TS 36.211, V8.0.0 (Sep. 2007).

Jim Zyren, Dr. Wes McCoy, Technical Editor, Overview of the 36PP Long Term Evolution Physical Layer; Document Number: 3GPPEVOLUTIONWP; Rev 0 Jul. 2007.

* cited by examiner

US 9,113,460 B2

MAPPING BETWEEN LOGICAL AND PHYSICAL UPLINK CONTROL RESOURCE BLOCKS IN WIRELESS NETWORKS

CLAIM OF PRIORITY UNDER 35 U.S.C. 119(e)

The present application is a Continuation of application Ser. No. 12/372,980 filed Feb. 18, 2009, which claims priority to and incorporates by reference U.S. Provisional Application Ser. No. 61/029,674, filed Feb. 19, 2008, entitled "Mapping Between Logical Uplink Control Resources Blocks and Physical Uplink Control Resource Blocks".

FIELD OF THE INVENTION

This invention generally relates to wireless cellular communication, and in particular to mapping between logical and physical resource blocks in orthogonal frequency division multiple access (OFDMA), DFT-spread OFDMA, and single carrier frequency division multiple access (SC-FDMA) systems.

BACKGROUND OF THE INVENTION

Wireless cellular communication networks incorporate a number of mobile UEs and a number of NodeBs. A NodeB is generally a fixed station, and may also be called a base transceiver system (BTS), an access point (AP), a base station (BS), or some other equivalent terminology. As improvements of networks are made, the NodeB functionality evolves, so a NodeB is sometimes also referred to as an evolved NodeB (eNB). In general, NodeB hardware, when deployed, is fixed and stationary, while the UE hardware is portable.

In contrast to NodeB, the mobile UE can comprise portable hardware. User equipment (UE), also commonly referred to as a terminal or a mobile station, may be fixed or mobile device and may be a wireless device, a cellular phone, a personal digital assistant (PDA), a wireless modem card, and so on. Uplink communication (UL) refers to a communication from the mobile UE to the NodeB, whereas downlink (DL) refers to communication from the NodeB to the mobile UE. Each NodeB contains radio frequency transmitter(s) and the receiver(s) used to communicate directly with the mobiles, which move freely around it. Similarly, each mobile UE contains radio frequency transmitter(s) and the receiver(s) used to communicate directly with the NodeB. In cellular networks, the mobiles cannot communicate directly with each other but have to communicate with the NodeB.

Control information bits are transmitted, for example, in the uplink (UL), for several purposes. For instance, Downlink Hybrid Automatic Repeat ReQuest (HARQ) requires at least one bit of ACK/NACK transmitted in the uplink, indicating successful or failed circular redundancy check(s) (CRC). Moreover, a one bit scheduling request indicator (SRI) is transmitted in uplink, when UE has new data arrival for transmission in uplink. Furthermore, an indicator of downlink channel quality (CQI) needs to be transmitted in the uplink to support mobile UE scheduling in the downlink. While CQI may be transmitted based on a periodic or triggered mechanism, the ACK/NACK needs to be transmitted in a timely manner to support the HARQ operation. Note that ACK/NACK is sometimes denoted as ACKNAK or just simply ACK, or any other equivalent term. Here, ACK refers to acknowledgement (successful CRC check) and NACK refers to negative-acknowledgement (failed CRC check). The ACK/NACK information is typically required to be highly reliable in order to support an appropriate and accurate HARQ operation. This uplink control information is typically transmitted using the physical uplink control channel (PUCCH), as defined by the 3GPP working groups (WG), for evolved universal terrestrial radio access (EUTRA). The EUTRA is sometimes also referred to as 3GPP long-term evolution (3GPP LTE). The structure of the PUCCH is designed to provide sufficiently high transmission reliability.

In addition to PUCCH, the EUTRA standard also defines a physical uplink shared channel (PUSCH), intended for transmission of uplink user data. The Physical Uplink Shared Channel (PUSCH) can be dynamically scheduled. This means that time-frequency resources of PUSCH are re-allocated every sub-frame. This (re)allocation is communicated to the mobile UE using the Physical Downlink Control Channel (PDCCH). Alternatively, resources of the PUSCH can be allocated semi-statically, via the mechanism of semi-persistent scheduling. Thus, any given time-frequency PUSCH resource can possibly be used by any mobile UE, depending on the scheduler allocation. Physical Uplink Control Channel (PUCCH) is different than the PUSCH, and the PUCCH is used for transmission of uplink control information (UCI). Frequency resources which are allocated for PUCCH are found at the two extreme edges of the uplink frequency spectrum. In contrast, frequency resources which are used for PUSCH are in between. Since PUSCH is designed for transmission of user data, retransmissions are possible, and PUSCH is expected to be generally scheduled with less standalone subframe reliability than PUCCH. The general operations of the physical channels are described in the EUTRA specifications, for example: "$3^{rd}$ Generation Partnership Project; Technical Specification Group Radio Access Network; Evolved Universal Terrestrial Radio Access (E-UTRA); Physical Channels and Modulation (Release 8)." (3GPP TS 36.211)

A reference signal (RS) is a pre-defined signal, pre-known to both transmitter and receiver. The RS can generally be thought of as deterministic from the perspective of both transmitter and receiver. The RS is typically transmitted in order for the receiver to estimate the signal propagation medium. This process is also known as "channel estimation." Thus, an RS can be transmitted to facilitate channel estimation. Upon deriving channel estimates, these estimates are used for demodulation of transmitted information. This type of RS is sometimes referred to as De-Modulation RS or DM RS. Note that RS can also be transmitted for other purposes, such as channel sounding (SRS), synchronization, or any other purpose. Also note that Reference Signal (RS) can be sometimes called the pilot signal, or the training signal, or any other equivalent term.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

In 3GPP LTE Uplink, the control channel is denoted as PUCCH (physical uplink control channel). The PUCCH occupies the edge frequency resource blocks (RBs) of the uplink channel with slot-based frequency hopping within a subframe. In networks with larger system bandwidth, it is common that multiple resource blocks will be assigned for PUCCH. The number of PUCCH RBs, denoted as $N_{PUCCH}$, is broadcasted in each cell. In this disclosure, a scheme for mapping between logical PUCCH RBs and physical RBs (PRBs) used by PUCCH is described.

Figure 1:
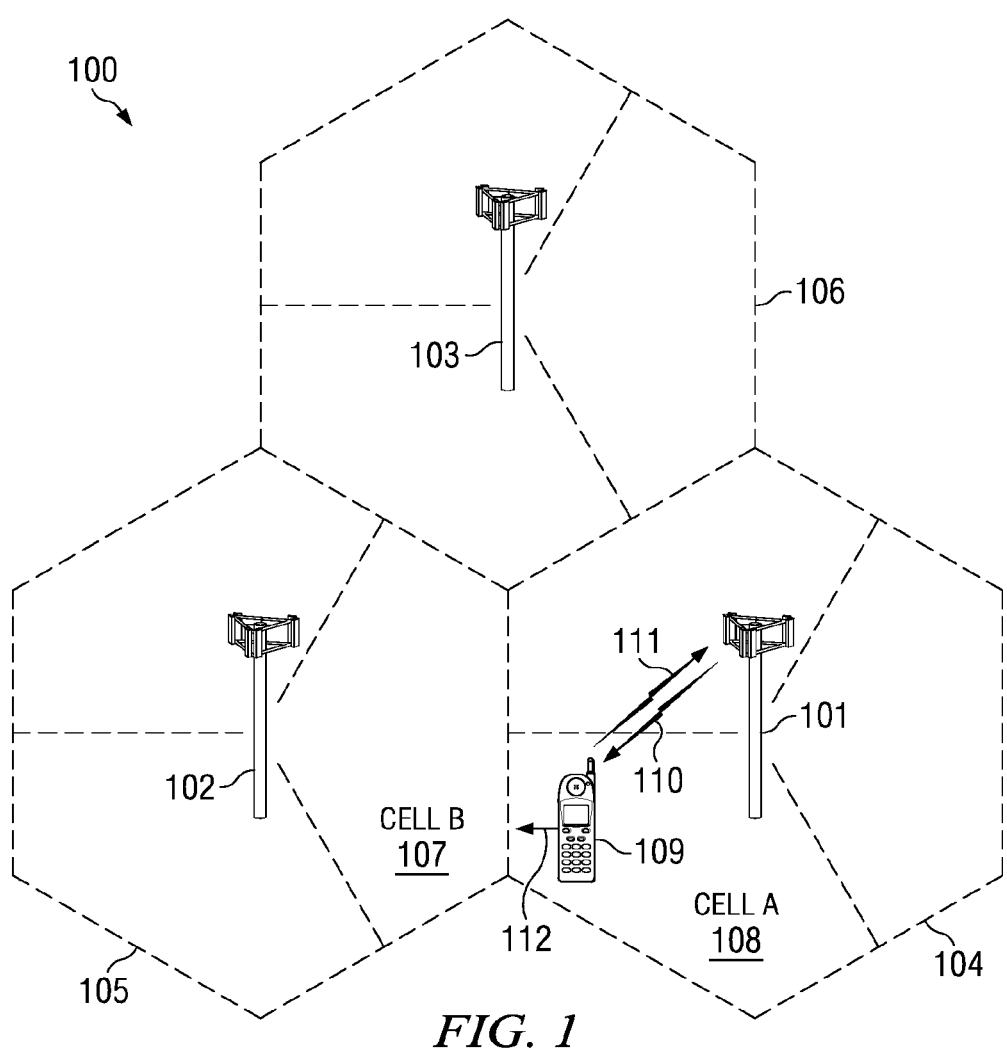
FIG. 1 is a pictorial of an illustrative telecommunications network that employs mapping between logical PUCCH RBs and physical RBs (PRBs)

FIG. 1 shows an exemplary wireless telecommunications network 100. The illustrative telecommunications network includes representative base stations 101, 102, and 103; however, a telecommunications network necessarily includes many more base stations. Each of base stations 101, 102, and 103 are operable over corresponding coverage areas 104, 105, and 106. Each base station's coverage area is further divided into cells. In the illustrated network, each base station's coverage area is divided into three cells. Handset or other UE 109 is shown in Cell A 108, which is within coverage area 104 of base station 101. Base station 101 is transmitting to and receiving transmissions from UE 109 via downlink 110 and uplink 111. As UE 109 moves out of Cell A 108, and into Cell B 107, UE 109 may be handed over to base station 102. Because UE 109 is synchronized with base station 101, UE 109 must employ non-synchronized random access to initiate handover to base station 102. A UE in a cell may be stationary such as within a home or office, or may be moving while a user is walking or riding in a vehicle. UE 109 moves within cell 108 with a velocity 112 relative to base station 102.

UE 109 and NodeBs 101-103 use an embodiment of a scheme for mapping between logical uplink control resource blocks and physical resource blocks used by PUCCH, as described in more detail below for PUCCH transmissions of ACKNAK and other feedback information to the serving NodeB, such as NodeB 101 while UE 109 is within cell 108.

Figure 2:
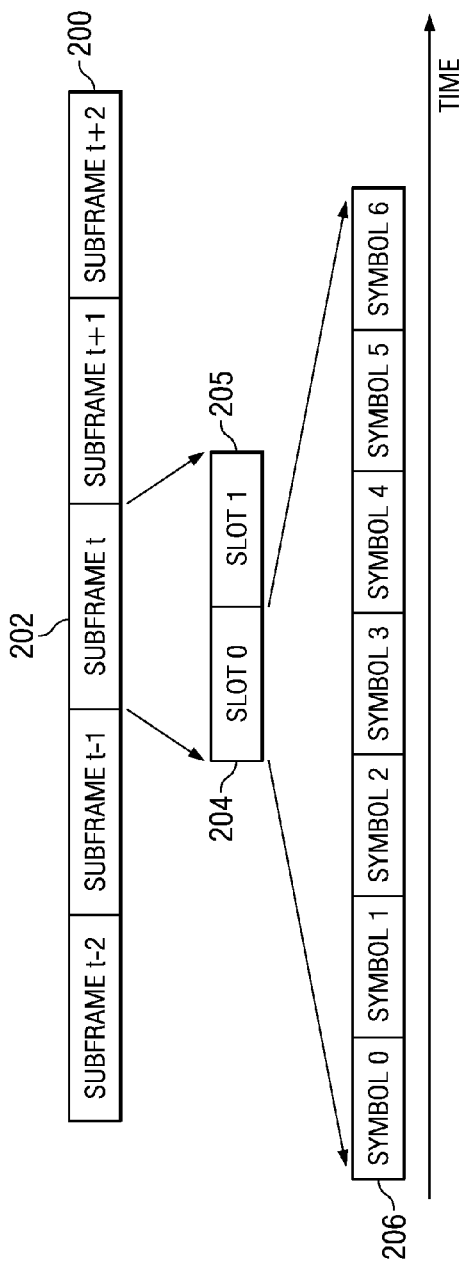
FIG. 2 illustrates an example frame structure used in the network of FIG. 1.

FIG. 2 is an example frame structure 200 used in the PUCCH of FIG. 1. Each frame 200 contains several sub-frames, as indicated generally at 202. In turn, sub-frame 202 contains two slots 204, 205. Each slot contains a number of information carrying symbols, generally indicated at 206. A cyclic prefix (CP) field is also appended to each symbol in order to improve reception integrity. In the current E-UTRA standard, each slot contains seven symbols 206 if a normal CP length is used or six symbols 206 if an extended CP length is used. Other embodiments of the invention may provide other frame structures than the exemplary frame structure illustrated in FIG. 2.

For PUCCH, a cyclically shifted or phrase ramped CAZAC-like sequence is transmitted in each symbol. Different cyclic shifts or different amounts of phrase ramping can be used to multiplex more than one UE's PUCCH transmission in the same physical resource block. A resource block in 3GPP E-UTRA is defined as twelve consecutive resource elements in frequency domain, wherein each resource element is of 15 kHz. Ideally, feedback for twelve UEs can be supported within one RB. However, due to spillover between consecutive cyclic shifts, it is recommended that not all 12 cyclic shifts are utilized.

For ACK/NAK transmission, additional orthogonal covering can be applied across the symbols in the time domain, thereby increasing the ACK/NAK multiplexing up to 36 UEs per PUCCH resource block. However, due to spillover between consecutive cyclic shifts, it is recommended that not all twelve cyclic shifts are utilized. In a typical embodiment, only eighteen ACK/NAK channels are used. An RB for transmission of ACKNAK is described in more detail below with respect to FIG. 3.

In each OFDM symbol, a cyclically shifted or phase ramped CAZAC-like sequence is transmitted. The CAZAC-like sequence in an RS OFDM symbol is un-modulated. The CAZAC-like sequence in a data OFDM symbol is modulated by the data symbol. Here the data symbol can be the ACK/NAK symbol, SRI symbol, Rank Indicator (RI) symbol, precoding matrix indicator (PMI) or channel quality indicator (CQI) symbol. In this disclosure, a CAZAC-like sequence generally refers to any sequence that has the property of constant amplitude zero auto correlation. Examples of CAZAC-like sequences includes but not limited to, Chu Sequences, Frank-Zadoff Sequences, Zadoff-Chu (ZC) Sequences, Generalized Chirp-Like (GCL) Sequences, or any computer generated CAZAC sequences. One example of a CAZAC-like sequence $\bar{r}_{u,v}(n)$ is given by $$\bar{r}_{u,v}(n) = e^{j\phi(n)\pi/4}, \quad 0 \leq n \leq M_{sc}^{RS} - 1$$

where $M_{sc}^{RS} = 12$ and $\phi(n)$ defined in Table 1.

In this disclosure, the cyclically shifted or phase ramped CAZAC-like sequence is sometimes denoted as cyclic shifted base sequence, cyclic shifted root sequence, phase ramped base sequence, phase ramped root sequence, or any other equivalent term.

TABLE 1

Definition of $\phi(n)$

| u | $\phi(0), \ldots, \phi(11)$ | | | | | | | | | | | |
|---|---|---|---|---|---|---|---|---|---|---|---|---|
| 0 | −1 | 1 | 3 | −3 | 3 | 3 | 1 | 1 | 3 | 1 | −3 | 3 |
| 1 | 1 | 1 | 3 | 3 | 3 | −1 | 1 | −3 | −3 | 1 | −3 | 3 |
| 2 | 1 | 1 | −3 | −3 | −3 | −1 | −3 | −3 | 1 | −3 | 1 | −1 |
| 3 | −1 | 1 | 1 | 1 | 1 | −1 | −3 | −3 | 1 | −3 | 3 | −1 |
| 4 | −1 | 3 | 1 | −1 | 1 | −1 | −3 | −1 | 1 | −1 | 1 | 3 |
| 5 | 1 | −3 | 3 | −1 | −1 | 1 | 1 | −1 | −1 | 3 | −3 | 1 |
| 6 | −1 | 3 | −3 | −3 | −3 | 3 | 1 | −1 | 3 | 3 | −3 | 1 |
| 7 | −3 | −1 | −1 | −1 | 1 | −3 | 3 | −1 | 1 | −3 | 3 | 1 |
| 8 | 1 | −3 | 3 | 1 | −1 | −1 | −1 | 1 | 1 | 3 | −1 | 1 |
| 9 | 1 | −3 | −1 | 3 | 3 | −1 | −3 | 1 | 1 | 1 | 1 | 1 |
| 10 | −1 | 3 | −1 | 1 | 1 | −3 | −3 | −1 | −3 | −3 | 3 | −1 |
| 11 | 3 | 1 | −1 | −1 | 3 | 3 | −3 | 1 | 3 | 1 | 3 | 3 |
| 12 | 1 | −3 | 1 | 1 | −3 | 1 | 1 | 1 | −3 | −3 | −3 | 1 |
| 13 | 3 | 3 | −3 | 3 | −3 | 1 | 1 | 3 | −1 | −3 | 3 | 3 |
| 14 | −3 | 1 | −1 | −3 | −1 | 3 | 1 | 3 | 3 | 3 | −1 | 1 |
| 15 | 3 | −1 | 1 | −3 | −1 | −1 | 1 | 1 | 3 | 1 | −1 | −3 |
| 16 | 1 | 3 | 1 | −1 | 1 | 3 | 3 | 3 | −1 | −1 | 3 | −1 |
| 17 | −3 | 1 | 1 | 3 | −3 | 3 | −3 | −3 | 3 | 1 | 3 | −1 |
| 18 | −3 | 3 | 1 | 1 | −3 | 1 | −3 | −3 | −1 | −1 | 1 | −3 |
| 19 | −1 | 3 | 1 | 3 | 1 | −1 | −1 | 3 | −3 | −1 | −3 | −1 |
| 20 | −1 | −3 | 1 | 1 | 1 | 1 | 3 | 1 | −1 | 1 | −3 | −1 |
| 21 | −1 | 3 | −1 | 1 | −3 | −3 | −3 | −3 | −3 | 1 | −1 | −3 |
| 22 | 1 | 1 | −3 | −3 | −3 | −3 | −1 | 3 | −3 | 1 | −3 | 3 |
| 23 | 1 | 1 | −1 | −3 | −1 | −3 | 1 | −1 | 1 | 3 | −1 | 1 |
| 24 | 1 | 1 | 3 | 1 | 3 | 3 | −1 | 1 | −1 | −3 | −3 | 1 |
| 25 | 1 | −3 | 3 | 3 | 1 | 3 | 3 | 1 | −3 | −1 | −1 | 3 |
| 26 | 1 | 3 | −3 | 3 | 3 | −3 | 1 | −1 | 1 | 3 | −1 | −3 |
| 27 | −3 | −1 | −3 | −1 | −3 | 3 | 1 | −1 | 1 | 3 | −3 | −3 |

TABLE 1-continued

| | Definition of φ(n) | | | | | | | | | | | |
|---|---|---|---|---|---|---|---|---|---|---|---|---|
| u | φ(0), . . . , φ(11) | | | | | | | | | | | |
| 28 | −1 | 3 | −3 | 3 | −1 | 3 | 3 | −3 | 3 | 3 | −1 | −1 |
| 29 | 3 | −3 | −3 | −1 | −1 | −3 | −1 | 3 | −3 | 3 | 1 | −1 |

The frame structure used in the PUSCH is similar to that illustrated in FIG. 2. Each resource block (RB) in PUSCH contains twelve resource elements, each of which covers a 15 kHz portion of the frequency spectrum. However, CDM is not employed in the PUSCH.

Figure 3:
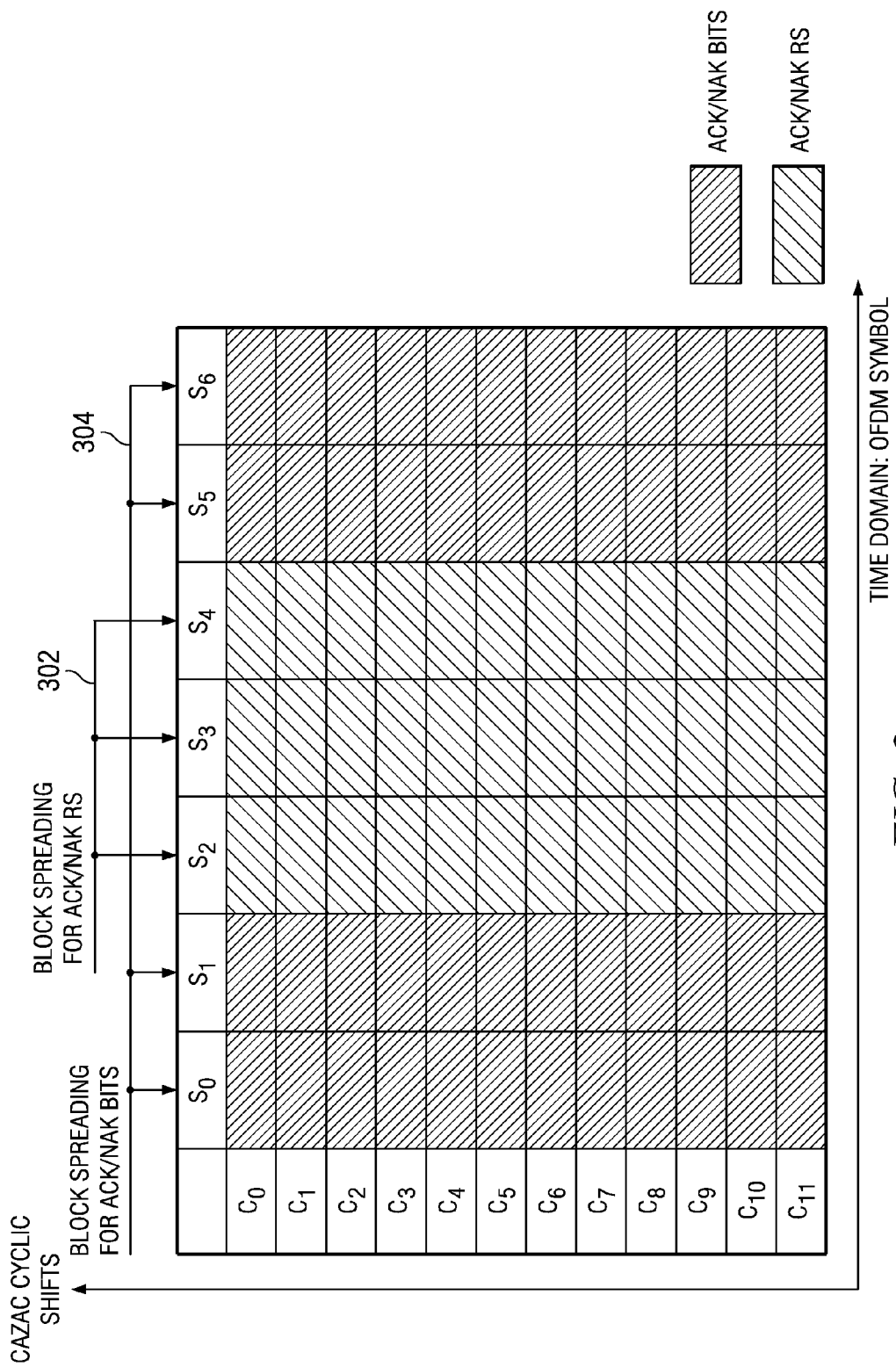
FIG. 3 is an illustration of one slot of one resource block in the PUCCH used in the network of FIG. 1.

FIG. 3 illustrates an orthogonal structure that supports transmission of ACKNAK on PUCCH by multiple users within the same frequency and time resource. FIG. 3 illustrates one slot of a transmission frame in which a normal cyclic prefix (CP) is used, where $c_0$-$c_{11}$ represent the cyclic shifts of a CAZAC-like sequence, and $S_0$ $S_6$ represent seven OFDM symbols per slot (0.5 ms). Without loss of generality, the middle three OFDM symbols $S_2$-$S_4$ are assumed to carry the reference signal (RS) for coherence demodulation, while the other four OFDM symbols carry the data information. Orthogonal covering 302 and 304, also known as block spreading or other similar terms, is applied to the RS OFDM symbols and the data bearing OFDM symbols, respectively. The data bearing OFDM symbols can be binary phase shift keying (BPSK) modulated, quadrature phase shift keying (QPSK) modulated, or ON-OFF keying modulated. In other embodiments, the RS and/or the data bearing symbols may be transmitted without the use of orthogonal covering. In other embodiments, the number of RS symbols and their positions may be varied.

Similarly, in one slot of a transmission frame in which an extended cyclic prefix (CP) is used there are only six symbols available per slot (0.5 ms). The middle two OFDM symbols are assumed to carry the reference signal (RS) for coherence demodulation, while the other four OFDM symbols carry the data information. Orthogonal covering is applied to the RS OFDM symbols and the data bearing OFDM symbols, respectively. The data bearing OFDM symbols are BPSK modulated, QPSK modulated, or ON-OFF keying modulated.

In another embodiment, CS0-CS11 represent 12 different amounts of phase ramping applied to a root CAZAC-like sequence. A cyclic shifted sequence is obtained by a cyclic shift operation on the root sequence, which is typically defined in the time domain. A phase ramped sequence is obtained by a phase ramping operation on the root sequence, which is typically defined in the frequency domain. The proposed method in this disclosure applies to both cyclic shifted sequences and phase ramped sequences.

To increase the ACK/NAK multiplexing capacity, block spreading is applied to the RS OFDM symbols and ACK/NAK bearing OFDM symbols, respectively. For example, the RS OFDM symbols are covered by block spreading codes 302 of length three, while the ACK/NAK bearing OFDM symbols are covered with block spreading codes 304 of length four.

In one embodiment of the resource block of FIG. 3, there may be a maximum of thirty-six ACK/NAK channels that exist in one PUCCH resource block in a sub-frame. However, the number of UEs transmitting ACK/NAK in the PUCCH RB can be less than thirty-six, since typically not all ACK/NAK channels are used in a subframe.

Figure 4:
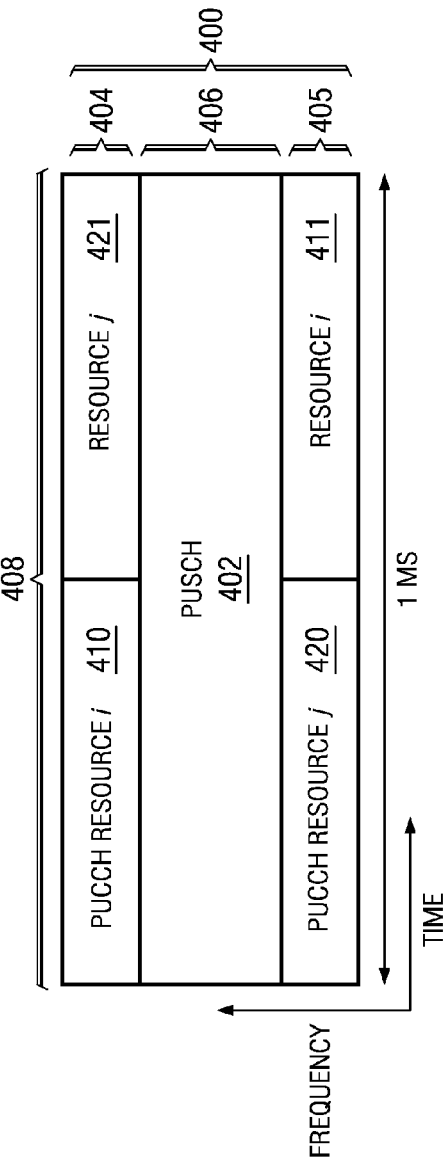
FIG. 4 is an illustration of an uplink channel that is used for the transmission of control and data in the network of FIG. 1.

FIG. 4 is an illustration of uplink 400 that is used for the transmission of control and data in the network of FIG. 1. FIG. 4 illustrates a period of one subframe 408, based on the frame structure of FIG. 2. In 3GPP LTE Uplink, the control channel is denoted as PUCCH (physical uplink control channel) and occupies the edge frequency resource blocks (RBs), indicated at 404 and 405 of the uplink 400. The PUCCH may utilize the resource block structure illustrated in FIG. 3 for the transmission of control and feedback information, such as ACKNAK and SRI. PUSCH 402 occupies the central portion of the bandwidth of uplink 400. As discussed above, one or more RBs are assigned to PUCCH and one or more RBs are assigned to PUSCH. As discussed above, each RB includes twelve resource elements, which may also be referred to as channels.

The PUCCH utilizes slot-based frequency hopping within a subframe. Resource 410, 411 and resource j 420, 421 are illustrative examples of frequency hopping within subframe 408. Resource i 410, 411 and resource j 420, 421 are representative of resources or channels that may be used by PUCCH for the transmission of various feedback and control information, such as ACK/NAK, SRI, and CQI.

In networks with larger system bandwidth, it is common that multiple resource blocks will be assigned for PUCCH. The number of PUCCH RBs, denoted as $N_{PUCCH}$, is broadcasted in each cell. In order to improve randomization of resource usage, a mapping scheme for mapping between logical PUCCH RBs and physical RBs (PRBs) can be used, as will be described in more detail below. The logical PUCCH RB index is the value conveyed implicitly or explicitly by a NodeB to a particular UE to indicate which RB that UE is to use in the cell served by the NodeB.

Mapping Between Logical PUCCH RBs and Physical RBs Assigned to PUCCH

Throughout this document, the following notations are used:

$N_{PRB}$ total number of physical resource blocks available in the system bandwidth for PUCCH and PUSCH on uplink.

$N_{PUCCH}$ total number of resource blocks assigned to PUCCH $n_{PRB}$ index to physical resource blocks, where $0 \leq n_{PRB} \leq N_{PRB}-1$ $n_{PUCCH,PRB}$ index to physical resource blocks assigned to PUCCH, where $0 \leq n_{PUCCH,PRB} \leq N_{PRB}-1$ $n_{puCCH,LRB}$ logical index to PUCCH resource blocks, where $0 \leq n_{PUCCH,LRB} \leq N_{PUCCH}-1$ Mapping Scheme 1

Figure 5:
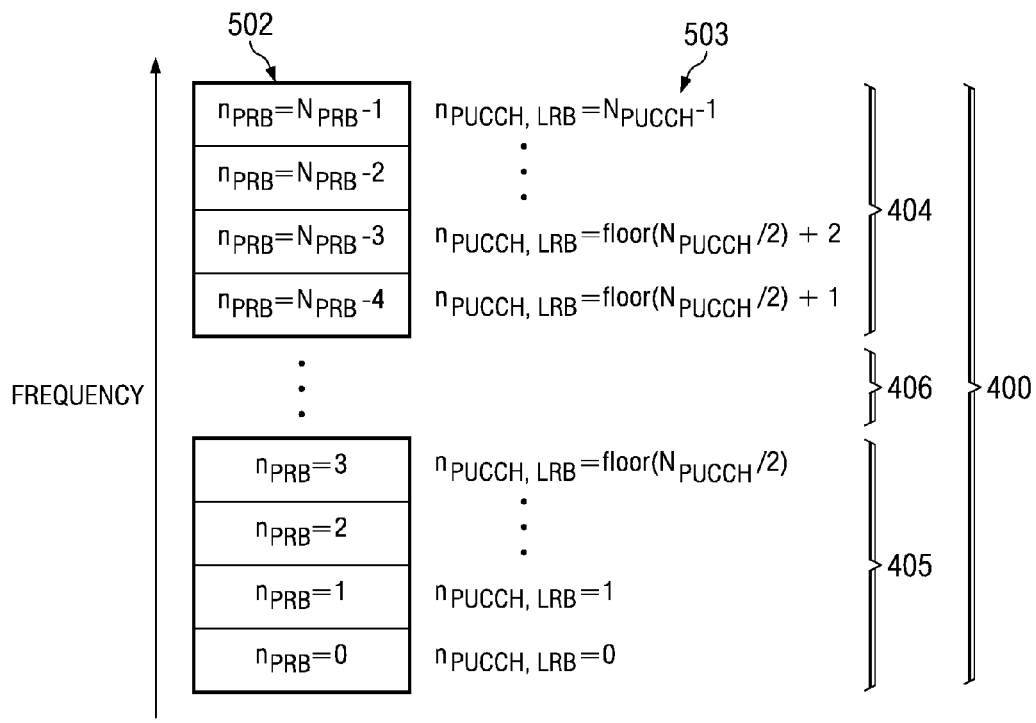
FIG. 5 illustrates a scheme for mapping between logical PUCCH RBs and physical RBs (PRBs) of FIG. 4.

FIG. 5 shows a first example of mapping between logical PUCCH RBs and physical resource blocks (PRBs) assigned for PUCCH 404, 405 in uplink 400. FIG. 5 illustrates mapping for the first slot of a subframe. The second slot may use a similar or different mapping, as will be described in more detail later. In essence, the mapping between the PRBs, indicated generally at 502, used for PUCCH $n_{PUCCH,PRB}$ and logical PUCCH RB index $n_{PUCCH,LRB}$, indicated generally at 503, can be described by equations (1) and (2). In other words, logical PUCCH RB is mapped in ascending order to the PRBs assigned to PUCCH.

$$n_{PUCCH,PRB} = n_{PUCCH,LRB}$$

if $n_{PUCCH,LRB} \leq \text{floor}(N_{PUCCH}/2)$ \hfill (1)

$$n_{PUCCH,PRB} = n_{PUCCH,LRB} + N_{PRB} - N_{PUCCH}$$

if $n_{PUCCH,LRB} > \text{floor}(N_{PUCCH}/2)$ \hfill (2)

where floor(x) is a function that returns the largest integer that is less than or equal to the value of its argument (x).

Alternatively, the mapping between the PRBs for PUCCH $n_{PUCCH,PRB}$ and logical PUCCH RB index $n_{PUCCH,LRB}$ can be described by equations (3) and (4).

$$n_{PUCCH,PRB} = n_{PUCCH,LRB}$$

$$\text{if } n_{PUCCH,LRB} \leq \text{ceil}(N_{PUCCH}/2) \quad (3)$$

$$n_{PUCCH,PRB} = n_{PUCCH,LRB} + N_{PRB} - N_{PUCCH}$$

$$\text{if } n_{PUCCH,LRB} > \text{ceil}(N_{PUCCH}/2) \quad (4)$$

where ceiling(x) is a function that returns the smallest integer that is greater than or equal to the value of its argument (x).

Mapping Scheme 2

Figure 6:
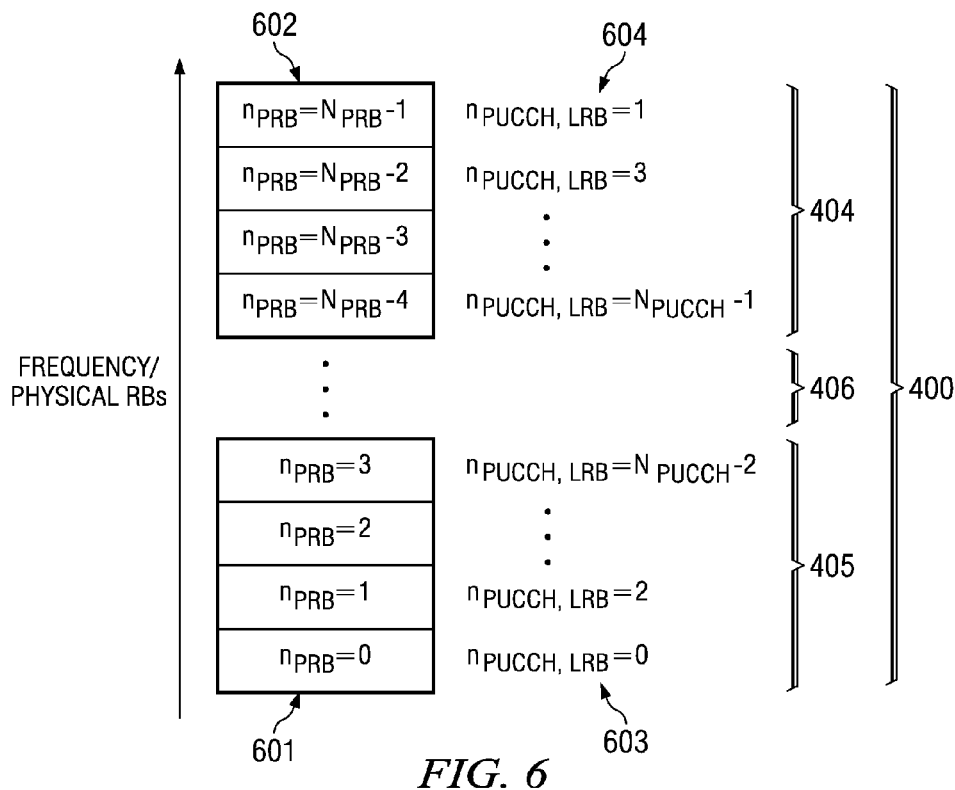
FIG. 6 illustrates another scheme for mapping between logical PUCCH RBs and physical RBs (PRBs) of FIG. 4.

FIG. 6 illustrates another mapping between logical PUCCH RBs and physical RBs (PRBs) in PUCCH 404, 405 of uplink 400. FIG. 6 illustrates mapping for the first slot of a subframe. The second slot may use a similar or different mapping, as will be described in more detail later. The logical PUCCH RBs with even indices, indicated generally at 603, are allocated in one edge of the system bandwidth, while the logical PUCCH RBs with odd indices, indicated generally at 604, are allocated in the other edge of the system bandwidth. At each edge of the system bandwidth, the logical PUCCH RBs with lower indices are mapped closer to the bandwidth edge, as indicated at 601 and 602. The mapping between the logical PUCCH RBs and PRBs assigned for PUCCH can be described by equations (5) and (6).

$$n_{PUCCH,PRB} = n_{PUCCH,LRB}/2$$

$$\text{if } n_{PUCCH,LRB} \text{ is even} \quad (5)$$

$$n_{PUCCH,PRB} = N_{PRB} - \text{ceil}(n_{PUCCH,LRB}/2)$$

$$\text{if } n_{PUCCH,LRB} \text{ is odd} \quad (6)$$

Mapping Scheme 3

Figure 7:
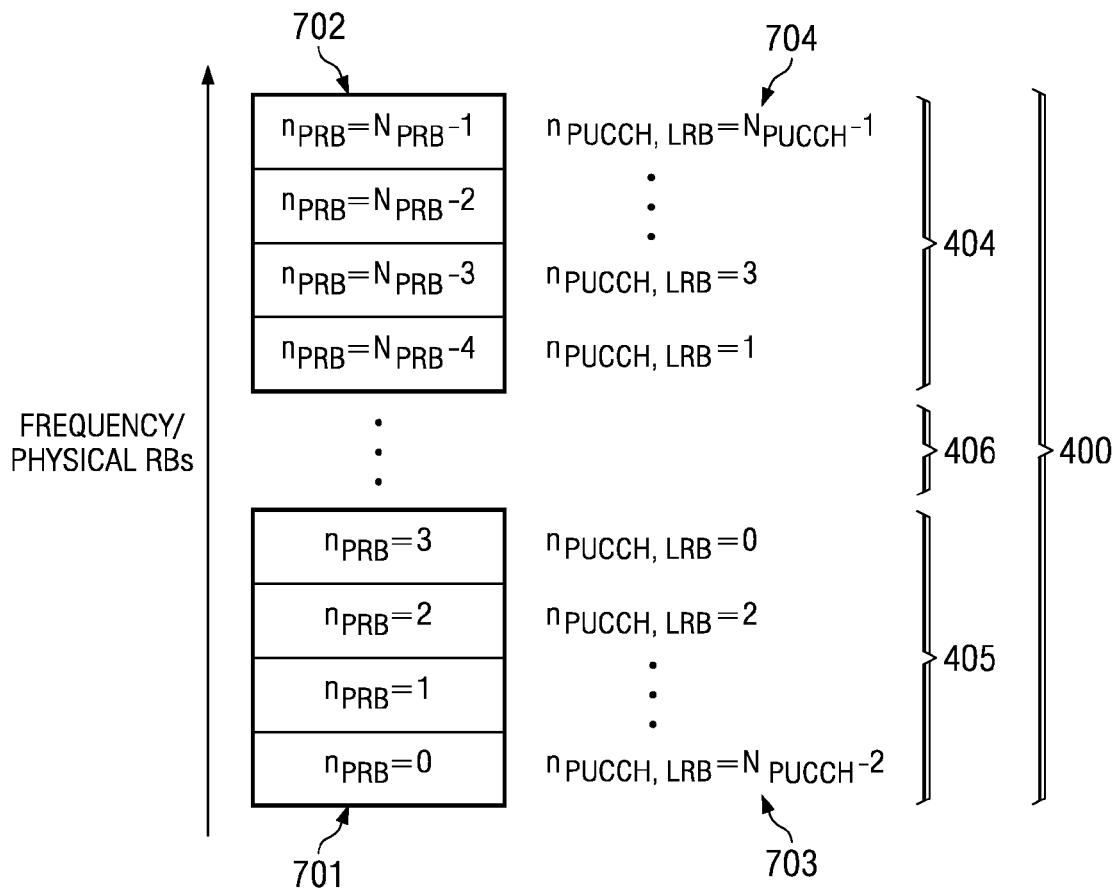
FIG. 7 illustrates another scheme for mapping between logical PUCCH RBs and physical RBs (PRBs) of FIG. 4.

FIG. 7 illustrates another mapping between logical PUCCH RBs and physical RBs (PRBs) in PUCCH 404, 405 of uplink 400. FIG. 7 illustrates mapping for the first slot of a subframe. The second slot may use a similar or different mapping, as will be described in more detail later. The logical PUCCH RBs with even indices are allocated in one edge of the system bandwidth, indicated generally at 703, while the logical PUCCH RBs with odd indices are allocated in the other edge of the system bandwidth, indicated generally at 704. At each edge of the system bandwidth, the logical PUCCH RBs with lower indices are mapped closer to the inner system bandwidth, indicated at 701, 702. The mapping between the logical PUCCH RBs and PRBs assigned for PUCCH can be described by equations (7) and (8).

$$n_{PUCCH,PRB} = \text{ceil}(N_{PUCCH}/2) - n_{PUCCH,LRB}/2 - 1 \text{ if } n_{PUCCH,LRB} \text{ is even} \quad (7)$$

$$n_{PUCCH,PRB} = N_{PRB} - \text{ceil}((N_{PUCCH} - n_{PUCCH,LRB})/2) \text{ if } n_{PUCCH,LRB} \text{ is odd} \quad (8)$$

SLOT Based Frequency Hopping for PUCCH

Note the mapping between logic PUCCH RBs and PRBs assigned to PUCCH is defined primarily for the first slot of a subframe, as described above with reference to FIGS. 5-7. Since frequency hopping is adopted for PUCCH, a specific hopping pattern is defined in this section.

The PRB of a PUCCH logical RB in the second slot can be symmetric to the PRB of the PUCCH logical RB in the first slot. Denote $n_{PUCCH,PRB,slot0}(n_{PUCCH,LRB})$ as the PRB index for logical PUCCH RB index $n_{PUCCH,LRB}$ in the first slot (slot 0), then the PRB index for the logical PUCCH RB index $n_{PUCCH,LRB}$ in the second slot (slot 1) can be expressed by equation (9).

$$n_{PUCCH,PRB,slot1}(n_{PUCCH,LRB}) = N_{PRB} - n_{PUCCH,PRB,slot0}(n_{PUCCH,LRB}) - 1 \quad (9)$$

Dynamic ACK/NAK Logical RB Offset on PUCCH

There are several types of control signals that can be transmitted on PUCCH, including but not limited to dynamic ACK/NAK, persistent ACK/NAK, Scheduling Request Indicator (SRI), Rank Indicator (RI), Precoding Matrix Indicator (PMI), and Channel Quality Indicator (CQI). The resources assigned to persistent ACK/NAK, SRI, and CQI/PMI/RI are explicitly signaled to UE by higher layer signaling, such as the radio resource control (RRC) protocol. On the other hand, the resources for dynamic ACK/NAK are implicitly derived from the control channel element (CCE) index on the UE's downlink control channel (a.k.a. PUCCH in 3GPP LTE). It is possible to allocate the first few logical PUCCH RBs for dynamic ACK/NAK. However, to allow flexible system configuration, in this section, an embodiment is described to introduce an offset on the logical PUCCH RBs for dynamic ACK/NAK resources.

The logical PUCCH RBs for dynamic ACK/NAK channels consist of consecutive logical PUCCH RBs. The starting logical PUCCH RB index for dynamic ACK/NAK is explicitly signaled to all UEs in the cell, by broadcast channels or higher layer signaling. The starting logical PUCCH RB for dynamic ACK/NAK can be cell specific, NodeB specific or common to all cells in the system.

In detail, denote $N_{PDCCH}$ as the number of CCEs (control channel elements) in PDCCH, then the number of PUCCH RBs needed for dynamic ACK/NAK is $$N_{RB,dyn,ACK/NAK} = \text{ceil}(N_{PDCCH}/m) \quad (10)$$

where m is the number of available dynamic ACK/NAK channels per RB. As mentioned earlier, in one embodiment there may be up to thirty-six ACK/NAK channels per RB, but in other embodiments the number of ACK/NAK channels per RB may be larger or smaller, depending on characteristics of a particular network or of a cell within the network.

Denote $\delta_{dyn,ACK/NAK,RB}$ as the starting PUCCH logical index for dynamic ACK/NAK RBs, where $0 \leq \delta_{dyn,ACK/NAK,RB} \leq N_{PUCCH} - 1$. Then the set of logical PUCCH RB indices for dynamic ACK/NAK, denoted as $S_{dyn,ACK/NAK,RB}$, is $$S_{dyn,ACK/NAK,RB} = \quad (11)$$
$$\left\{ \begin{array}{l} \delta_{dyn,ACK/NAK,RB},\ \text{mod}\ (\delta_{dyn,ACK/NAK,RB} + 1, N_{PUCCH}), \\ \ldots,\ \text{mod}(\delta_{dyn,ACK/NAK,RB} + N_{RB,dyn,ACK/NAK} - 1, N_{PUCCH}) \end{array} \right\}$$

where the function mod(x,y) returns the integer remainder of the arguments (x/y). Denote $n_{CCE}$ as the CCE index, where $0 \leq n_{CCE} \leq N_{PDCCH} - 1$. Then the logical PUCCH RB, where the dynamic ACK/NAK channel associated with CCE $n_{CCE}$ resides, is $$n_{PUCCH,LRB}(n_{CCE}) = \text{mod}(\delta_{dyn,ACK/NAK,RB} + \text{floor}(n_{CCE}/m), N_{PUCCH}) \quad (12)$$

The logical PUCCH RBs for dynamic ACK/NAK channel is further mapped to the physical RBs allocated for PUCCH, for example, by schemes in the preceding sections of this disclosure.

Figure 8:
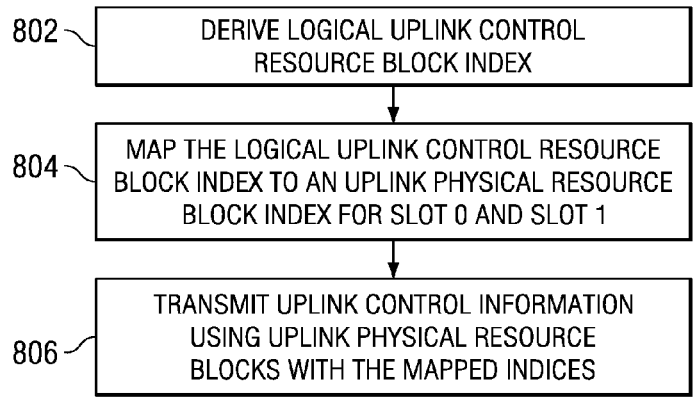
FIG. 8 is a flow diagram illustrating mapping of logical to physical resource block indices according to an embodiment of the present invention.

FIG. 8 is a flow diagram illustrating mapping of a logical resource block index to a physical resource block index according to an embodiment of the present invention. As mentioned earlier, in 3GPP LTE Uplink, the control channel is denoted as PUCCH (physical uplink control channel). The PUCCH occupies the edge frequency resource blocks (RBs) of the uplink channel with slot-based frequency hopping within a subframe. In networks with larger system bandwidth, it is common that multiple resource blocks will be assigned for PUCCH. The number of PUCCH RBs, denoted as $N_{PUCCH}$, is broadcasted in each cell. The logical PUCCH RB index is the value conveyed implicitly or explicitly by a NodeB to a particular UE to indicate which RB that UE is to use in the cell served by the NodeB.

The UE derives 802 a logical uplink control resource block index $n_{LRB}$ from the transmission from the NodeB. In one embodiment, $n_{LRB}$ is transmitted as a parameter by the NodeB to the UE. In another embodiment, the UE receives an offset value $\Delta$, where $\Delta$ may represent $\delta_{dyn,ACK/NAK,RB}$ as the starting PUCCH logical index for dynamic ACK/NAK RBs, where $0 \leq \delta_{dyn,ACK/NAK,RB} \leq N_{PUCCH}-1$. The UE then derives an uplink control channel index I using the downlink control channel information provided by the NodeB. In one embodiment, I represents $n_{CCE}$ as the CCE index, where $0 \leq n_{CCE} \leq N_{PDCCH}-1$, which is provided to the UE by the NodeB. The UE then derives $n_{LRB}$ using I and $\Delta$. In one embodiment, this is done using the equation (12).

The UE then maps 804 the logical uplink control resource block index $n_{LRB}$ to a first uplink physical resource block index $n_{PRB,1}$ of a plurality of uplink physical resource blocks according to scheme 2 above, wherein $n_{PRB,1} = n_{LRB}/2$ if $n_{LRB}$ is even and $n_{PRB,1} = N_{PRB} - \text{ceil}(n_{LRB}/2)$ if $n_{LRB}$ is odd; wherein $N_{PRB}$ is a total number of the plurality of uplink physical resource blocks; and wherein ceil denotes the ceiling operation. In another embodiment, the mapping may be done according to scheme 1 or according to scheme 3 above.

When the UE is ready to transmit, it forms a modulated transmission signal that is compatible with the orthogonal structures illustrated in FIGS. 2-3 in a subframe using one of a plurality of uplink physical resource blocks indexed by $n_{PRB,1}$. This transmission signal is received by the NodeB serving the UE and demodulated by the NodeB.

For the second slot of a subframe, a second uplink physical resource block index $n_{PRB,2}$ is derived 804, wherein $n_{PRB,2} = N_{PRB} - 1 - n_{PRB,1}$. In this case, the uplink control information is transmitted in the first slot using the uplink physical resource block indexed by $n_{PRB,1}$; and the uplink control information is transmitted in the second slot using the uplink physical resource block indexed by $n_{PRB,2}$.

As discussed earlier, the uplink control information may be selected from a set including channel quality indicator, rank indicator, ACK/NAK, scheduling request indicator, and precoding matrix indicator, for example.

Figure 9:
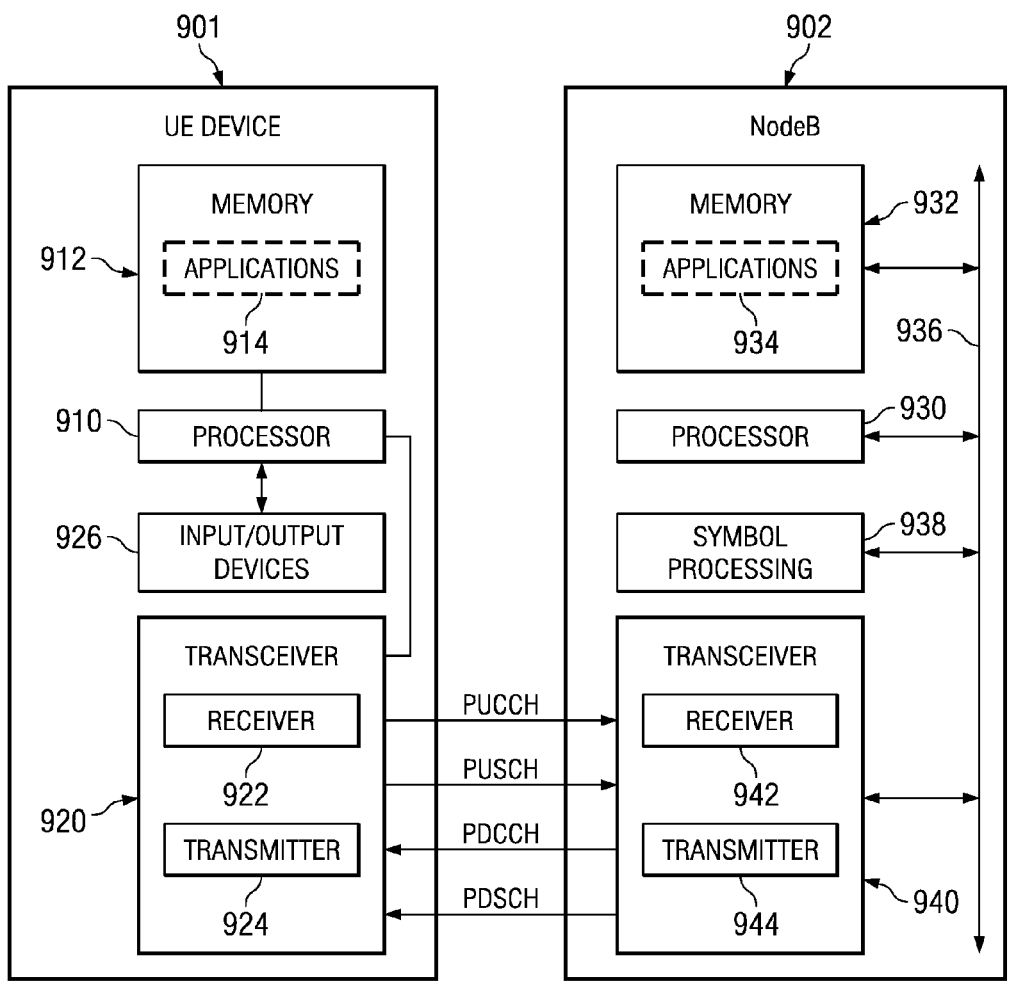
FIG. 9 is a block diagram of a Node B and a User Equipment for use in the network system of FIG. 1.

FIG. 9 is a block diagram illustrating operation of a NodeB 902 and a mobile UE 901 in the network system of FIG. 1. The mobile UE device 901 may represent any of a variety of devices such as a server, a desktop computer, a laptop computer, a cellular phone, a Personal Digital Assistant (PDA), a smart phone or other electronic devices. In some embodiments, the electronic mobile UE device 901 communicates with the NodeB 902 based on a LTE or E-UTRAN protocol. Alternatively, another communication protocol now known or later developed can be used.

As shown, the mobile UE device 901 comprises a processor 910 coupled to a memory 912 and a Transceiver 920. The memory 912 stores (software) applications 914 for execution by the processor 910. The applications could comprise any known or future application useful for individuals or organizations. As an example, such applications could be categorized as operating systems (OS), device drivers, databases, multimedia tools, presentation tools, Internet browsers, e-mailers, Voice-Over-Internet Protocol (VOIP) tools, file browsers, firewalls, instant messaging, finance tools, games, word processors or other categories. Regardless of the exact nature of the applications, at least some of the applications may direct the mobile UE device 901 to transmit UL signals to the NodeB (base-station) 902 periodically or continuously via the transceiver 920. In at least some embodiments, the mobile UE device 901 identifies a Quality of Service (QoS) requirement when requesting an uplink resource from the NodeB 902. In some cases, the QoS requirement may be implicitly derived by the NodeB 902 from the type of traffic supported by the mobile UE device 901. As an example, VOIP and gaming applications often involve low latency uplink (UL) transmissions while High Throughput (HTP)/Hypertext Transmission Protocol (HTTP) traffic can involve high-latency uplink transmissions.

Transceiver 920 includes uplink logic which may be implemented by execution of instructions that control the operation of the transceiver. Some of these instructions may be stored in memory 912 and executed when needed by processor 910. As would be understood by one of skill in the art, the components of the Uplink Logic may involve the physical (PHY) layer and/or the Media Access Control (MAC) layer of the transceiver 920. Transceiver 920 includes one or more receivers 922 and one or more transmitters 924.

Processor 910 may send or receive data to various input/output devices 926. A subscriber identity module (SIM) card stores and retrieves information used for making calls via the cellular system. A Bluetooth baseband unit may be provided for wireless connection to a microphone and headset for sending and receiving voice data. Processor 910 may send information to a display unit for interaction with a user of the mobile UE during a call process. The display may also display pictures received from the network, from a local camera, or from other sources such as a USB connector. Processor 910 may also send a video stream to the display that is received from various sources such as the cellular network via RF transceiver 922 or the camera.

During transmission and reception of voice data or other application data, transmitter 924 sends ACKNAK information and other control and feedback information via the PUCCH to the serving NodeB 902, using a scheme for mapping between logical PUCCH RBs and physical RBs (PRBs) used by PUCCH, as described in more detail above. In this embodiment, the mapping scheme is embodied by executing instructions stored in memory 912 by processor 910. In other embodiments, the mapping scheme may be embodied by a separate processor/memory unit, by a hardwired state machine, or by other types of control logic, for example.

The mapped subframe containing feedback or control information such as ACKNAK, etc. is then transmitted by transmitter 924, as described in more detail with regard to FIGS. 2-3.

NodeB 902 comprises a Processor 930 coupled to a memory 932, symbol processing circuitry 938, and a transceiver 940 via backplane bus 936. The memory stores applications 934 for execution by processor 930. The applications could comprise any known or future application useful for managing wireless communications. At least some of the applications 934 may direct the base-station to manage transmissions to or from the user device 901.

Transceiver 940 comprises an uplink Resource Manager, which enables the NodeB 902 to selectively allocate uplink PUSCH resources to the user device 901. As would be understood by one of skill in the art, the components of the uplink resource manager may involve the physical (PHY) layer and/or the Media Access Control (MAC) layer of the transceiver 940. Transceiver 940 includes a Receiver(s) 942 for receiving transmissions from various UE within range of the NodeB and transmitter(s) 944 for transmitting data and control information to the various UE within range of the NodeB.

The uplink resource manager executes instructions that control the operation of transceiver 940. Some of these instructions may be located in memory 932 and executed when needed on processor 930. The resource manager controls the transmission resources allocated to each UE that is being served by NodeB 902 and broadcasts control information via the physical downlink control channel PDCCH.

Symbol processing circuitry 938 performs demodulation using known techniques. ACKNAK and other control and feedback information received from UE 901 is de-modulated using an agreed upon scheme for mapping between logical PUCCH RBs and physical RBs (PRBs) used by PUCCH as described in more detail above. The specific mapping scheme that a given UE is to use may be communicated from the NodeB to the UE via a control transmission. Alternately, mapping parameters may be agreed upon and each UE in the network is configured accordingly in an offline manner, for example.

Other Embodiments

While the invention has been described with reference to illustrative embodiments, this description is not intended to be construed in a limiting sense. Various other embodiments of the invention will be apparent to persons skilled in the art upon reference to this description. For example, a larger or smaller number of symbols then described herein may be used in a slot.

While thirty-six potential ACKNAK channels are defined in the present embodiments for one resource block, not all thirty-six channels are used simultaneously. In another embodiment the size of a resource block and the resultant number of potential channels may be increased or decreased.

While one particular slot based frequency hopping scheme was described, other schemes may be formed by various combinations of the three mapping schemes described herein for the first and second slots of a subframe.

While exemplary equations are used to describe an embodiment of a mapping scheme between the logical control resource blocks and the physical resource blocks used for the transmissions of control information, other equations describing the same embodiment of the mapping scheme may exist.

As used herein, the terms "applied," "coupled," "connected," and "connection" mean electrically connected, including where additional elements may be in the electrical connection path. "Associated" means a controlling relationship, such as a memory resource that is controlled by an associated port.

It is therefore contemplated that the appended claims will cover any such modifications of the embodiments as fall within the true scope and spirit of the invention.

What is claimed is:

1. A base station for use in a wireless network, comprising:
   processing circuitry connected to receiver circuitry and to transmitter circuitry, the receiver circuitry being operable to receive an uplink control information in a subframe using one of the plurality of uplink physical resource blocks indexed by $n_{PRB,1}$;
   wherein a first uplink physical resource block index $n_{PRB,1}$ of a plurality of uplink physical resource blocks is given by $n_{PRB,1}=n_{LRB}/2$ if $n_{LRB}$ is even and $n_{PRB,1}=N_{PRB}-\text{ceil}(n_{LRB}/2)$ if $n_{LRB}$ is odd;
   wherein $N_{PRB}$ is the total number of the plurality of uplink physical resource blocks;
   wherein the logical uplink control resource block index $n_{LRB}$ is based on information transmitted by the transmitter circuitry; and
   wherein ceil denotes the ceiling operation.

2. The base station of claim 1, wherein a second uplink physical resource block index $n_{PRB,2}$ is given by a $n_{PRB,2}=N_{PRB}-1-n_{PRB,1}$.

3. The base station of claim 2, wherein the receiver is operable to receive the uplink control information in a first slot of a subframe having two slots using the uplink physical resource block indexed by $n_{PRB,1}$, and receive the uplink control information in the second slot using the uplink physical resource block indexed by $n_{PRB,2}$.

4. The base station of claim 1, wherein the transmitter circuitry is operable to transmit an offset value $\Delta$; and
   wherein the logical uplink control resource block $n_{LRB}$ is derived using an uplink control channel index I and the offset value $\Delta$.

5. The base station of claim 1 being an Enhanced NodeB (eNB).

6. The base station of claim 1, wherein the uplink control channel index I is derived using the downlink control channel information for a given UE.

7. The base station of claim 1, wherein the uplink control information is ACK/NAK.

8. An apparatus for operating in a wireless communication system, comprising:
   circuitry for deriving a logical uplink control resource block index $n_{LRB}$;
   circuitry for mapping the logical uplink control resource block index $n_{LRB}$ to a first uplink physical resource block index $n_{PRB,1}$ of a plurality of uplink physical resource blocks, wherein $n_{PRB,1}=n_{LRB}/2$ if $n_{LRB}$ is even and $n_{PRB,1}=N_{PRB}-\text{ceil}(n_{LRB}/2)$ if $n_{LRB}$ is odd;
   wherein $N_{PRB}$ is the total number of the plurality of uplink physical resource blocks; and wherein ceil denotes the ceiling operation; and
   circuitry for transmitting an uplink control information in a subframe using one of the plurality of uplink physical resource blocks indexed by $n_{PRB,1}$.

9. The apparatus of claim 8, further comprising circuitry for deriving a second uplink physical resource block index $n_{PRB,2}$, wherein $n_{PRB,2}=N_{PRB}-1-n_{PRB,1}$.

10. The apparatus of claim 9, wherein the subframe comprises two slots; and wherein transmitting the uplink control information further comprises:
    transmitting the uplink control information in the first slot using the uplink physical resource block indexed by $n_{PRB,1}$; and
    transmitting the uplink control information in the second slot using the uplink physical resource block indexed by $n_{PRB,2}$.

11. The apparatus of claim 10, wherein the uplink control information is selected from a set consisting of channel quality indicator, rank indicator, ACK/NAK, scheduling request indicator, and precoding matrix indicator.

12. The apparatus of claim 8, wherein deriving the logical uplink control resource block $n_{LRB}$ further comprises:
    an offset value $\Delta$;
    an uplink control channel index I; and
    $n_{LRB}$ derived using I and $\Delta$.

13. The apparatus of claim 12, wherein deriving the uplink control channel index I further comprises:
a downlink control channel; and
an uplink control channel index I derived using the downlink control channel information.

14. The apparatus of claim 12, wherein the uplink control information is ACK/NAK.

15. An apparatus, comprising:
processing circuitry operable to derive a logical uplink control resource block index $n_{LRB}$;
processing circuitry operable to map the logical uplink control resource block index $n_{LRB}$ to a first uplink physical resource block index $n_{PRB,1}$ of a plurality of uplink physical resource blocks, wherein $n_{PRB,1} = n_{LRB}/2$ if $n_{LRB}$ is even and $n_{PRB,1} = N_{PRB} - \text{ceil}(n_{LRB}/2)$ if $n_{LRB}$ is odd;
wherein $N_{PRB}$ is the total number of the plurality of uplink physical resource blocks;
wherein ceil denotes the ceiling operation; and
a transmitter operable to transmit uplink control information in the uplink physical resource block indexed by $n_{PRB,1}$.

16. The apparatus of claim 15, wherein the processing circuitry operable to map the logical uplink control resource block index $n_{LRB}$ is further operable to derive a second uplink physical resource block index $n_{PRB,2}$, wherein $n_{PRB,2} = N_{PRB} - 1 - n_{PRB,1}$.

17. The apparatus of claim 16, wherein the transmitter is further operable to transmit uplink control information in a first slot of a subframe having two slots using the uplink physical resource block indexed by $n_{PRB,1}$, and transmit the uplink control information in the second slot using the uplink physical resource block indexed by $n_{PRB,2}$.

18. The apparatus of claim 15, further comprising receiver circuitry operable to receive an offset value $\Delta$; and
processing circuitry operable to derive the logical uplink control resource block $n_{LRB}$ by deriving an uplink control channel index I, and deriving $n_{LRB}$ using I and $\Delta$.

19. The apparatus of claim 17 being a cellular telephone.

* * * * *